(12) United States Patent
Klingenberg et al.

(10) Patent No.: US 7,342,068 B2
(45) Date of Patent: Mar. 11, 2008

(54) AQUEOUS POLYURETHANE DISPERSION AND METHOD FOR MAKING AND USING SAME

(75) Inventors: Eric Howard Klingenberg, Emmaus, PA (US); Shafiq Nisarali Fazel, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 10/715,916

(22) Filed: Nov. 18, 2003

(65) Prior Publication Data

US 2005/0107564 A1     May 19, 2005

(51) Int. Cl.
C08J 3/03       (2006.01)
C08L 75/08      (2006.01)
C09J 175/08     (2006.01)
C08G 18/48      (2006.01)
C08G 18/76      (2006.01)

(52) U.S. Cl. .............. 524/591; 524/401; 524/404; 524/408; 524/414; 524/418; 524/419; 524/701; 524/706; 524/779; 524/787; 524/839; 524/840; 528/59; 528/61; 528/71

(58) Field of Classification Search ............... 524/401, 524/404, 408, 414, 418, 419, 591, 701, 706, 524/779, 787, 839, 840; 528/59, 61, 71
See application file for complete search history.

(56) References Cited

U.S. PATENT DOCUMENTS

| | | | |
|---|---|---|---|
| 4,269,748 A | 5/1981 | Nachtkamp et al. | |
| 4,528,323 A | 7/1985 | Lorenz et al. | |
| 4,855,077 A * | 8/1989 | Shikinami et al. | 252/519.34 |
| 4,871,798 A | 10/1989 | Dormish et al. | |
| 4,914,161 A | 4/1990 | Muller et al. | |
| 5,124,400 A | 6/1992 | Tirpak et al. | |
| 5,270,433 A | 12/1993 | Klauck et al. | |
| 5,354,807 A | 10/1994 | Dochniak | |
| 5,432,228 A | 7/1995 | Hilken et al. | |
| 5,494,960 A | 2/1996 | Rolando et al. | |
| 5,571,857 A | 11/1996 | Gruber et al. | |
| 5,576,382 A | 11/1996 | Seneker et al. | |
| 5,616,400 A | 4/1997 | Zhang | |
| 5,637,639 A | 6/1997 | Duan et al. | |
| 5,703,158 A | 12/1997 | Duan et al. | |
| 5,912,093 A | 6/1999 | Wen et al. | |
| 5,965,195 A | 10/1999 | Müller et al. | |
| 5,981,650 A | 11/1999 | Zhao et al. | |
| 6,077,897 A | 6/2000 | Wen et al. | |
| 6,084,051 A | 7/2000 | Blum et al. | |
| 6,172,126 B1 | 1/2001 | Müller et al. | |
| 6,191,213 B1 | 2/2001 | Tomko et al. | |
| 6,235,384 B1 | 5/2001 | Voss et al. | |
| 6,312,304 B1 | 11/2001 | Duthaler et al. | |
| 6,312,792 B1 | 11/2001 | Okada et al. | |
| 6,420,478 B1 | 7/2002 | Irle et al. | |
| 6,433,073 B1 | 8/2002 | Kantner et al. | |
| 6,433,996 B1 | 8/2002 | Hata et al. | |
| 6,515,070 B2 | 2/2003 | Kobylanska et al. | |
| 6,576,702 B2 | 6/2003 | Anderle et al. | |
| 2003/0011867 A1 | 1/2003 | Loxley | |
| 2003/0025855 A1 | 2/2003 | Holman et al. | |
| 2003/0083457 A1* | 5/2003 | Schafheutle et al. | 528/71 |
| 2003/0125457 A1* | 7/2003 | Schafheutle et al. | 524/589 |

FOREIGN PATENT DOCUMENTS

| | | | |
|---|---|---|---|
| EP | 385462 | * | 9/1990 |
| JP | 1112339 A | | 1/1999 |
| JP | 3361691 B2 | | 1/2003 |
| WO | WO 03/046095 A1 | | 6/2003 |

OTHER PUBLICATIONS

Szycher, Michael; Szycher's Handbook of Polyurethanes; CRC Press; New York; 1999, pp. 3-27 and 3-28.*
"TMXDI® (META) Aliphatic Isocyanate, Dispersions for Solvent-Free Adhesives," Cytec Industries, Inc., 2001 , pp. 1-13.
"TMXDI® (META) Aliphatic Isocyanate, Dispersions in Inks," Cytec Industries, Inc., 2001, pp. 1-8.
"TMXDI® (META) Aliphatic Isocyanate, The Choice for Aqueous Polyurethane Dispersions," Cytec Industries, Inc., 2001, pp. 1-18.
D. Dieterich, "Aufbau von Netzwerken aus Präpolymeren," *Angewandte Makromolekulare Chemie 76/77*, 1979, pp. 79-107 (Nr. 1114).
D. Dieterich, "Neuere WäBrige PUR-Systeme," *Die Angewandte Makromolekulare Chemie 98* (1981), pp. 133-165 (Nr. 1568).
H. Ulrich, "Urethane Polymers," *Kirk-Othmer Encyclopedia of Chemical Technology*, 1997, #3, 6 pages.
H. Ulrich, "Urethane Polymers," *Kirk-Othmer Encyclopedia of Chemical Technology*, 1997, #4, 8 pages.
J. J. Fontanella, "Pressure and Temperature Variation of the Electrical Conductivity of Poly(propylene glycol) containing $LiCF_3SO_3$," Journal of Chemical Physics, vol. 111, No. 15, 1999, pp. 7103-7109.

(Continued)

*Primary Examiner*—Rabon Sergent
(74) *Attorney, Agent, or Firm*—Joseph D. Rossi (57) ABSTRACT

Aqueous polyurethane dispersions comprising polyurethane polymer and methods for making and using same are disclosed herein. In one aspect of the present invention, aqueous polyurethane dispersions, comprising a polyurethane polymer having a weight average molecular weight ranging from 20,000 to 80,000, are prepared by controlling the weight average molecular weight of the polymer by reacting the isocyanate terminated prepolymer with at least one chain terminating agent; and/or maintaining a N/COOH molar ratio of amine in the neutralizing agent to acid functional group in the isocyanate reactive compound to from about 0.5:1 to about 1:1.

25 Claims, 3 Drawing Sheets

OTHER PUBLICATIONS

M. A. Ratner, et al., "Ion Transport in Solvent-Free Polymers," Chem. Rev. 1988, 88, pp. 109-124.

M. C. Wintersgill, et al., "Electrical Conductivity, DSC and NMR Studies of PEG and PPG Containing Lithium Salts," Solid State Ionics 135, 2000, pp. 155-161.

N. Ogata, "Ion-Conducting Polymers," Journal of Macromolecular Science, Part C—Polymer Reviews, vol. C42, No. 3, 2002, pp. 399-439.

O. Lorenz, et al., "Einfluß von Lösungsmitteln auf den Partikeldurchmesser von Dispersionen anionischer Polyurethanionomerer," *Die Angewandte Makromolekulare Chemie* 72, 1978, pp. 115-123 (Nr. 1095).

T. Wen, et al., "Blending Thermoplastic Polyurethanes and Poly-(ethylene oxide) for Composite Electrolytes Via a Mixture Design Approach," National Cheng Kung University, Taiwan, 1999, pp. 680-692.

T. Wen, et al., "Soft Segmental Effect of Methylene Bis($p$-cyclohexyl isocyanate) Based Thermoplastic Polyurethane Impregnated with Lithium Perchlorate/Propylene Carbonate on Ionic Conductivity," National Cheng Kung University, Taiwan, 2000, pp. 935-942.

W. D. Davies, "Some Property Aspects of Aqueous Polyurethane Ionmer Dispersions," Spec. Publ.—R. Soc. Chem., 1190, pp. 181-209.

S. Y. Lee, et al., "Preparation and Properties of Water-borne Polyurethanes," *Polymer International*, 42, pp. 67-76 (1997).

B. K. Kim, "Aqueous Polyurethane Dispersions," *Colloid & Polymer Science*, vol. 274, pp. 599-611 (1996).

D. Dieterich, "Introduction to Urethane Ionomers," *Adv. Urethane Ionomers*, Bayer AG, Germany, pp. 1-21 (1995).

C. Yang, et al., "Application and Statistical Experimental Strategies to the Process Optimization of Waterborne Polyurethane," *Polymer Engineering and Science*, vol. 35, No. 8, pp. 722-730 (1995).

S. D. Seneker, et al., "New Polyether Polyots for Aqueous Polyurethane Dispersions," ARCO Chemical Company, presented at UTECH Asia '97, SunTec City, Singapore (1997).

D. Dieterich, "Aqueous Emulsions, Dispersions and Solutions of Polyurethanes; Synthesis and Properties," *Progress in Organic Coatings*, vol. 9, pp. 281-340 (1981).

S. Ramesh, et al., "Chain-Extended Polyurethane Anionomers Using Ionic Diols of Varying Methylene Spacers," *Journal of Polymer Science: Part A: Polymer Chemistry*, vol. 34, pp. 1713-1721 (1996).

F. M. B. Coutinho, et al., "Synthesis and Molecular Weight Determination of Urethane-Baed Anlonomers," *Polymer Bulletin*, vol. 37, pp. 1-5 (1996).

J. Chen, et al., Synthesis of Polyurethane Acrylate Oligomers Based on Polybutadiene Polyol, *Journal of Polymer Science: Part A: Polymer Chemistry*, vol. 34, pp. 2889-2907 (1996).

T. K. Kim, et al., "Preparations and Properties of Polyurethane Aqueous Dispersion from Uncatalized Systems of $H_{12}$MDI, PTAd/ bisphenol A Polyol, and DMPA," *Colloid & Polymer Science*, vol. 269, pp. 889-894 (1991).

C. K. Kim, et al., "Aqueous Dispersion of Polyurethane Ionomers from Hexamethylene Diisocyanate and Trimellitic Anhydride," *Colloid & Polymer Science*, vol. 269, pp. 895-900 (1991).

* cited by examiner

AQUEOUS POLYURETHANE DISPERSION AND METHOD FOR MAKING AND USING SAME

BACKGROUND OF THE INVENTION

Polyurethane polymers generally contain carbamate groups, (—NHCOO—), also referred to herein as urethane groups, and urea groups (CO(NH)$_2$) in their backbone structure. They are typically formed by the reaction of a diisocyanate with a polyol and polyamines. In the last several years, aqueous based-polyurethane dispersions are becoming increasingly used in a variety of applications such as, but not limited to, ink, surface coatings such as roof, floor, flexible, plastic, and specialty coatings, and adhesives. The prior art provides many examples of aqueous-based polyurethane dispersions and methods for making same such as, but not limited to, U.S. Pat. Nos. 4,528,323; 4,871,798; 5,124,400; 5,270,433; 5,432,228; 5,494,960; 5,576,382; 5,616,400; 5,703,158; 5,981,650; and 6,433,073.

Polyurethane adhesives are known for excellent adhesion, flexibility, toughness, high cohesive strength, and fast cure rates. In certain applications, polyurethane adhesives rely on the curing of multifunctional isocyanate-terminated prepolymers with moisture or on the reaction of the adhesive with the substrate, e.g., wood and cellulosic fibers. Two-component adhesives consist of an isocyanate prepolymer, which is cured with low equivalent weight diols, polyols, diamines, or polyamines. Such systems can be used neat or as solution. The two components are kept separately before application. Two-component polyurethane systems are also used as hot-melt adhesives. Water-borne adhesives are preferred because of restrictions on the use of solvents. In this connection, low viscosity prepolymers are emulsified in water, followed by chain extension with water-soluble glycols or diamines.

Adhesives are being increasingly used in the manufacture of electronic devices. In such devices, the application of the adhesive, specific bonding process and electrical properties of the material are increasingly becoming critical to the overall performance and lifetime of the electronic device. The adhesive typically should perform similarly at one condition after being exposed to different conditions. For example, a device that shows good contrast ratio and switching times at 25° C. and 80% relative humidity, should have the same performance when returned to this condition after being exposed to high or low temperatures and humidity for short periods of time. This requirement necessitates that the adhesive electrical properties and adhesion are not altered by exposure to these conditions. It is believed that the electrical properties of the adhesive, specifically volume resistivity and/or conductivity, are related to the materials ability to be ionically conductive.

There are many patents and descriptions of such adhesive materials that are used in electronic devices that demonstrate certain adhesive and electrical properties. However, most of these materials refer to curable systems that are filled with conductive media. Relatively fewer references to non-curable adhesives are provided. This is especially true of lamination adhesives made using aqueous polyurethane dispersions having a polyurethane polymer contained therein that have the potential to serve as ionically conducting polymeric electrolytes.

All references cited herein are incorporated herein by reference in their entirety.

BRIEF SUMMARY OF THE INVENTION

Aqueous polyurethane dispersions and methods for making and using same are disclosed herein. In one aspect of the present invention, there is provided a process for forming an aqueous polyurethane dispersion comprising: providing an isocyanate terminated prepolymer by reacting (i) at least one diisocyanate comprising α,α,α,α-tetramethylxylene diisocyanate, (ii) at least one difunctional polyol comprising polypropylene glycol, and (iii) at least one isocyanate reactive compound comprising an acid functional group and at least two isocyanate reactive groups selected from a hydroxy, a primary amino, a secondary amino, and combinations thereof; neutralizing the isocyanate reactive compound (iii) with a neutralizing agent comprising an amine group; reacting the isocyanate terminated prepolymer with at least one chain terminating agent; dispersing the isocyanate terminated prepolymer in water; and reacting the isocyanate terminated prepolymer with at least one chain extending agent comprising an organic diamine.

In another aspect of the present invention, there is provided a process forming an aqueous polyurethane dispersion comprising a polyurethane polymer wherein the polyurethane polymer has a weight average molecular weight ranging from 20,000 to 80,000 comprising: preparing a reaction mixture comprising (i) at least one diisocyanate comprising α,α,α,α-tetramethylxylene diisocyanate, (ii) at least one difunctional polyol comprising polypropylene glycol, (iii) at least one isocyanate reactive compound comprising an acid functional group and at least two isocyanate reactive groups selected from a hydroxy, a primary amino, a secondary amino, and combinations thereof, optionally (iv) a catalyst, and optionally (v) a solvent, wherein the weight percentage of free isocyanate groups contained within the reaction mixture ranges from about 1.6 to about 2.6 weight percent based upon solids; adding a neutralizing agent comprising a tertiary amino group to the reaction mixture wherein the neutralizing agent is present in an amount sufficient to neutralize from about 50 to about 105 mole percent based upon solids of the acid functional group contained within the at least one isocyanate reactive compound (iii); adding a chain terminating agent to the reaction mixture wherein the chain terminating agent is present in an amount sufficient to react with from about 2 to 50 mole percent of the remaining isocyanate groups contained therein to provide an isocyanate terminated prepolymer; dispersing the isocyanate terminated prepolymer in water to provide an aqueous dispersion; and adding a chain extending agent to the aqueous dispersion in an amount sufficient to react with about 80 to 105 mole percent of the remaining isocyanate groups contained therein to provide the aqueous polyurethane dispersion.

In a still further aspect of the present invention, there is provided a process for forming an aqueous polyurethane dispersion comprising a polyurethane polymer wherein the polyurethane polymer has a weight average molecular weight ranging from 20,000 to 80,000 comprising: preparing a isocyanate terminated prepolymer by reacting (i) at least one diisocyanate comprising α,α,α,α-tetramethylxylene diisocyanate, (ii) at least one difunctional polyol comprising polypropylene glycol, and (iii) at least one isocyanate reactive compound comprising an acid functional group and at least two isocyanate reactive groups selected from a hydroxy, a primary amino, a secondary amino, and combinations thereof; contacting the isocyanate terminated prepolymer with a neutralizing agent comprising an amine group; controlling the weight average molecular weight of the polyurethane polymer by reacting the isocyanate terminated prepolymer with at least one chain terminating agent; and/or maintaining a N/COOH molar ratio of amine in the neutralizing agent to acid functional group in the isocyanate reactive compound (iii) to from about 0.5:1 to about 1:1; dispersing the isocyanate terminated prepolymer in water to provide an aqueous dispersion; and adding a chain extending agent to the aqueous dispersion in an amount sufficient to react with at least a portion of the isocyanate groups contained therein to provide the aqueous polyurethane dispersion.

In yet another aspect of the present invention, there is provided an aqueous polyurethane dispersion comprising the reaction product of: (a) an isocyanate terminated prepolymer comprising the reaction product of (i) at least one polyisocyanate comprising α,α,α,α-tetramethylxylene diisocyanate, (ii) at least one difunctional polyol comprising polypropylene glycol, and (iii) an isocyanate reactive compound comprising an acid functional group and at least two isocyanate reactive groups selected from a hydroxy, a primary amino, a secondary amino, and combinations thereof; (b) a neutralizing agent comprising a tertiary amino group; (c) a monofunctional chain terminating agent; (d) a chain extending agent comprising an organic diamine; and (e) water.

In a still further aspect of the present invention, there is provided an aqueous polyurethane dispersion comprising: (A) a polyurethane polymer that is the reaction product of: (a) an isocyanate terminated prepolymer comprising the reaction product of (i) at least one polyisocyanate comprising α,α,α,α-tetramethylxylene diisocyanate, (ii) at least one difunctional polyol comprising polypropylene glycol, and (iii) an isocyanate reactive compound comprising an acid functional group and at least two isocyanate reactive groups selected from a hydroxy, a primary amino, a secondary amino, and combinations thereof; (b) a neutralizing agent comprising an amine; (c) a chain terminating agent; (d) a chain extending agent comprising an organic diamine; and (e) water and (B) at least one ionic additive selected from an inorganic salt, an organic salt, and combinations thereof.

These and other aspects of the invention will become apparent from the following detailed description.

DETAILED DESCRIPTION OF THE INVENTION

An aqueous polyurethane dispersion and methods for making and using same are disclosed herein. The polyurethane polymer contained within the aqueous polyurethane dispersion of the present invention exhibits a relatively lower molecular weight, i.e., a weight average molecular weight ($M_w$) which ranges from 20,000 to 80,000, typically from 40,000 to 60,000, or more typically from 45,000 to 55,000, or a number average molecular weight ($M_n$) that ranges from typically 12,000 to 30,000 or more typically from 14,000 to 20,000 than comparable polyurethane polymers contained within similar dispersions. It has now been found that aqueous polyurethane dispersions containing relatively lower molecular weight polyurethane polymers may exhibit properties that allow them to be ideally suited for use, for example, as a lamination adhesive in electronic devices. In this connection, the aqueous polyurethane dispersion of the present invention, when dried, is substantially free of crystallinity (as detected by. Differential Scanning Calorimetry (DSC)), water resistive, has a base volume resistivity that ranges from $1 \times 10^{10}$ to $1 \times 10^{11}$ ohm-cm, and can be exposed to a number of different environments (i.e., temperature, humidity, etc.) without adversely effecting the material properties. In certain embodiments, the base volume resistivity can be adjusted within or outside of the aforementioned range by adding an ionic additive such as an inorganic salt, organic salt, or combinations thereof to the aqueous polyurethane dispersion.

The aqueous polyurethane dispersion is made in at least two stages: the prepolymer formation and the dispersion formation. In the first stage, an isocyanate terminated prepolymer is prepared by combining chemical reactants including at least one isocyanate reactive compound capable of imparting some hydrophilicity to the material, neutralizing the isocyanate reactive group with a neutralizing agent having a suitable organic counter ion, and optionally reacting at least a portion of the isocyanate end groups of the isocyanate terminated prepolymer with a chain terminating agent. In the second stage, the aqueous polyurethane dispersion is prepared by dispersing the prepolymer in water to provide an aqueous-based dispersion, and chain extending the prepolymer with a chain extending agent. In certain preferred embodiments, the aforementioned steps within each stage are conducted sequentially. However, in alternative embodiments, one or more of the above steps of either or both stages may be performed in a variety of different orders or during at least a portion of one or more steps. In certain instances, for example, the neutralizing step may be conducted during at least a portion of the reacting step, the neutralizing step may be conducted during at least a portion of the dispersing step, or the reacting step may be conducted during at least a portion of the chain extending steps, and variations thereof.

It is believed that the molecular weight of polyurethane polymer contained within the aqueous polyurethane dispersion may be controlled by adding at least one chain terminating agent to the reaction mixture and/or monitoring the amount of amine from the neutralizing agent to acid functional groups from the isocyanate reactive compound, expressed herein as the "N/COOH ratio", within the reaction mixture. Either or both of these methods for controlling molecular weight are preferably performed prior to dispersing the prepolymer in water. In the latter method, the N/COOH ratio is preferably effected by using a molar equivalents ratio of a tertiary amine-based neutralizing agent to the carboxylic acid in the isocyanate reactive compound ranging from about 0.5:1 to about 1:1 N/COOH, preferably from about 0.5:1 to about 0.75:1 N/COOH.

The isocyanate terminated prepolymer is prepared from a reaction mixture comprising at least one diisocyanate, at least one difunctional polyol, at least one isocyanate reactive compound, a neutralizing agent, optionally a chain terminating agent, optionally a catalyst, and optionally a solvent. The reaction occurs using a stoichiometric excess of the at least one diisocyanate relative to the at least one difunctional polyol and the at least one isocyanate reactive compound to produce an oligomer which may contain urethane and urea functional groups. The amount of at least one diisocyanate within the isocyanate terminated prepolymer may range from about 20% to about 30% by weight of the reaction mixture (excluding solvent if present).

Exemplary diisocyanate compounds include aromatic, cycloaliphatic, or aliphatic diisocyanates such as, but not limited to, α,α,α,α-tetramethylxylene diisocyanate (TMXDI™), 3,5,5-trimethyl-1-isocyanato-3-isocyanatomethylcyclohexane isophorone diisocyanate (IPDI) and derivatives thereof, tetramethylene diisocyanate, hexamethylene diisocyanate (HDI) and derivatives thereof, 2,4-toluene diisocyanate, 2,6-toluene diisocyanate, isophorone diisocyanate, m-isopropenyl-α,α-dimethylbenzyl isocyanate (TMI), 4,4'dicyclohexylmethane diisocyante (H12MDI), benzene 1,3-bis(1-iscyanato-1-methylethyl), 1-5 naphthalene diisocyanate (NDI), pphenylene diisocyanate (PPDI), trans-cyclohexane-1,4-diisocyanate (TMI), bitolylene diisocyanate (TODI), 4,4'-diphenylmethane diisocyanate, 4,4'-diphenyl dimethyl methane diisocyanate, di- and tetraalkyl diphenyl methane diisocyanate, 4,4'-dibenzyl diisocyanate, 1,3-phenylene diisocyanate, 1,4-phenylene diisocyanate, the isomers of tolylene diisocyanate, 1-methyl-2,4-diisocyanatocyclohexane, 1,6-diisocyanato-2,2,4-trimethyl hexane, 1,6-diisocyanato-2,4,4-trimethyl hexane, 1-isocyanatomethyl-3-isocyanatomethyl-3-isocyanato-1,5,5-trimethyl cyclohexane, chlorinated and brominated diisocyanates, phosphorus-containing diisocyanates, 4,4'-diisocyanatophenyl perfluoroethane, tetramethoxy butane-1,4-diisocyanate, butane-1,4-diisocyanate, hexane-1,6-diisocyanate, dicyclohexyl methane diisocyanate, cyclohexane-1,4-diisocyanate, ethylene diisocyanate, phthalic acid-bis-isocyanatoethyl ester, also polyisocyanates containing reactive halogen atoms, such as 1-chloromethylphenyl-2,4-diisocyanate, 1-bromomethylphenyl-2,6-diisocyanate, 3,3-bis-chloromethylether-4,4'-diphenyl diisocyanate. Sulfur-containing polyisocyanates can be obtained, for example, by the reaction of 2 moles hexamethylene diisocyanate with 1 moles thiodiglycol or dihydroxydihexyl sulfide. Other exemplary diisocyanates include trimethyl hexamethylene diisocyanate, 1,4-diisocyanatobutane, 1,2-diisocyanatododecane, dimer fatty acid diisocyanate, and partly masked polyisocyanates which provide for the formation of self-crosslinking polyurethanes, for example, dimeric tolylene diisocyanate, or polyisocyanates partly reacted, for example, with phenols, tertiary butanol, phthalimide, caprolactam. The diisocyanates listed above may be used alone or in admixture.

In certain embodiments of the present invention, the at least one diisocyante compound comprises α,α,α,α-tetramethylxylene diisocyanate (TMXDI™) (manufactured by Cytec Industries, Inc. of West Paterson, N.J.). The TMXDI™ may be used alone, or in combination with one or more other diisocyanates such, for example, as those disclosed herein. In these embodiments, at least about 50 weight % or greater, preferably at least about 80 weight % or greater, or most preferably about 100 weight %, based upon the total weight of the at least one diisocyanate compound in the reaction mixture, comprises TMXDI™.

As mentioned previously, the isocyanate terminated prepolymer is prepared using at least one polyol. The term "polyol" as used herein refers to any organic compound having 2 or more hydroxyl groups that are capable of reacting with an isocyanate group. The amount of at least one polyol within the isocyanate terminated prepolymer may range from about 65% to about 75% by weight of the reaction mixture (excluding solvent if present).

It is preferable that the at least one polyol have a $M_w$ or $M_n$ molecular weight that ranges from about 400 to about 6,000, assuming a polydispersity of 1. At least one polyols having molecular weights ranging from 400 to 6,000, particularly include diols and triols and mixtures thereof. Higher functionality polyols, however, may also be used, for example, as minor components in admixture with diols. The polyols may be members of any of the chemical classes of polymeric polyols used or proposed for use in polyurethane formulations. Polyester polyols which may be used include, for example, hydroxyl-terminated reaction products of polyhydric alcohols such as ethylene glycol, propylene glycol, diethylene glycol, neopentyl glycol, 1,4-butane diol, furan dimethanol, cyclohexane dimethanol, glycerol, trimethylolpropane or pentaerythritol, or mixtures thereof, with polycarboxylic acids, especially dicarboxylic acids or their ester-forming derivatives, for example succinic, glutaric and adipic acids or their methyl esters, phthalic anhydride or dimethyl terephthalate. Polyesters obtained by the polymerization of lactones, for example caprolactone, in conjunction with a polyol may also be used.

Polyether polyols which may be used include products obtained by the polymerization of a cyclic oxide, for example, ethylene oxide, propylene oxide or tetrahydrofuran or by the addition of one or more such oxides to polyfunctional initiators, for example, water, ethylene glycol, propylene glycol, diethylene glycol, cyclohexane dimethanol, glycerol, trimethylol-propane, pentaerythritol or Bisphenol A. Additional exemplary polyethers include polyoxypropylene diols and triols, poly(oxyethylene-oxypropylene) diols and triols obtained by the simultaneous or sequential addition of ethylene oxide and propylene oxide to appropriate initiators and polytetramethylene ether glycols obtained the polymerization of tetrahydrofuran. Further examples of suitable polyols may be found, for example, in U.S. Pat. No. 5,270,433, which is incorporated herein by reference in its entirety.

In certain preferred embodiments, the at least one polyol is a difunctional polyol. Examples of suitable difunctional polyols include polyethylene glycol, polypropylene glycol (PPO), polytetramethylene glycol (PTMEG), and mixtures thereof where the $M_w$ or $M_n$ molecular weight ranges from about 400 to about 6000. In certain preferred embodiments, the at least one difunctional polyol comprises at least about 75 weight % or greater, or more preferably at least about 95 weight % or greater of a PPO having a molecular weight of around 2,000, based upon the total weight of the at least one polyol in the reaction mixture.

The reaction mixture further comprises at least one isocyanate reactive compound. The term "isocyanate reactive compound" as used herein relates to a compound that contains a carboxylate, sulfonate, and/or tertiary amino functionality capable of forming a hydrophilic ionic center when neutralized with an appropriate counter ion. The at least one isocyanate reactive compound is present within the reaction mixture (excluding solvent and one or more neutralizing agents if present) in an amount sufficient to provide an acid number based upon solids ranging from 17 to 22 mg of KOH/g. In this regard, the amount of at least one isocyanate reactive compound within the isocyanate terminated prepolymer may range from about 4% to about 6% by weight of the reaction mixture (excluding solvent if present).

In certain preferred embodiments, the at least one isocyanate reactive compound contains an acid functional group such as a carboxylate, sulfonate, or tertiary amino functionality and at least two other isocyanate reactive groups such as hydroxy, primary amino, and secondary amino groups. Isocyanate reactive compounds containing carboxylic groups which may be used in the preparation of the isocy- anate terminated prepolymers include carboxylic group-containing diols and triols, for example, dihydroxyalkanoic acids of the formula:

where R is hydrogen or a $C_1$ to $C_{12}$ alkyl group. In certain preferred embodiments, the at least one isocyanate reactive compound comprises the carboxylic-containing diols dimethylolpropionic acid (DMPA) and/or dimethylol butanioc acid (DMBA). Preferably, the at least one isocyanate reactive compound comprises DMPA.

In alternative embodiments, the carboxylic-containing diol or triol isocyanate reactive compound may be incorporated into a polyester by reaction with a dicarboxylic acid before being incorporated into the prepolymer. Contemplated as the functional equivalent of the carboxylic-containing, isocyanate reactive compounds may also include those isocyanate-reactive materials that contain an acidic functionality other than a carboxylic group, e.g., a sulfate or phosphate group.

The isocyanate reactive groups may be neutralized via one or more neutralizing agents. In certain preferred embodiments, the neutralizing step is conducted prior to the dispersing step. While not intending to be bound by theory, it is believed that the amount of neutralizing agent that is used is important in affecting the aqueous polyurethane dispersion. In this connection, it is believed that too much neutralization may result in a water soluble polymer that yields a polymer solution rather than a dispersion whereas too little neutralization may result in an unstable dispersion. The amount of neutralizing agent present may range from about 1.75% to about 3.75%, preferably from about 1.9% to about 3.25%, and more preferably from about 2.0% to about 2.5% by weight of the reaction mixture. In certain preferred embodiments, the amount of neutralizing agent that is added is sufficient to react about 50 to 105 molar % of the acid groups contained within the isocyanate reactive compound. Suitable neutralizing agents include inorganic bases such as potassium hydroxide, lithium hydroxide, tertiary amines such as triethylamine, tri butyl amine, monoethyl di proyl amine, mono ethyl dibutyl amine, diethyl mono propyl amine, diethyl monobutyl amine etc. Particularly preferred are tertiary amines such as those having the following formula:

wherein R, $R^1$ and $R^2$ are each independently a $C_1$ to $C_4$ alkyl group or a $C_1$ to $C_4$ hydroxyalkyl group. In certain preferred embodiments, the neutralizing agent comprises triethyl amine.

In certain preferred embodiments of the present invention, one or more chain terminating agents may be used to control the molecular weight of polyurethane polymer contained within the aqueous polyurethane dispersion. The amount of chain terminating agent present may range from 0% to about 2.5%, preferably from about 0.3% to about 1.25%, and more preferably from about 0.5% to about 0.8% by weight of the reaction mixture excluding solvent (if present). In certain preferred embodiments such as those where the neutralizing agent is added prior to the chain terminating agent, the amount of chain terminating agent that is added is sufficient to react about from about 2 to 50 molar % of the remaining isocyanate groups contained therein. Compounds, particularly monofunctional compounds, such as those containing hydroxyl, amino, and thio groups that have only one active hydrogen relative to isocyanate groups are suitable chain terminating agents. Examples of suitable monofunctional chain terminators include amino alcohols, ammonia, primary or secondary aliphatic, alicyclic, aromatic, araliphatic or heterocyclic amines, especially primary aliphatic amines such as ethylamine. Compounds containing secondary amino groups are preferred. Most preferred are those compounds wherein at least one of the organic groups attached to the nitrogen atom contains greater than 2 carbon atoms. In certain preferred embodiments, the chain terminating agent comprises di-n-butylamine.

After and/or during the step wherein the prepolymer mixture is dispersed in water, one or more chain-extending agents is added to provide the aqueous polyurethane dispersion. The amount of chain extending agent present may range from about 0.65% to about 1.05%, preferably from about 0.75% to about 1%, and more preferably from about 0.80% to about 0.95% by weight of the reaction mixture excluding solvent and water (if present). In certain preferred embodiments, the amount of chain extending agent that is added is sufficient to react from about 80 to 105 molar % of the remaining isocyanate groups contained therein. Ideal chain-extending agents contain at least two functional groups that are capable of reacting with isocyanates. They can contain hydroxyl, thio, or amino groups in any combination. Exemplary chain-extending agents containing at least one basic nitrogen atom are, for example, mono-, bis- or polyalkoxylated aliphatic, cycloaliphatic, aromatic or heterocyclic primary amines, such as N-methyl diethanolamine, N-ethyl diethanolamine, N-propyl diethanolamine, N-isopropyl diethanolamine, N-butyl diethanolamine, N-isobutyl diethanolamine, N-oleyl diethanolamine, N-stearyl diethanolamine, ethoxylated coconut oil fatty amine, N-allyl diethanolamine, N-methyl diisopropanolamine, N-ethyl diisopropanolamine, N-propyl diisopropanolamine, N-butyl diisopropanolamine, C-cyclohexyl diisopropanolamine, N,N-diethoxylaniline, N,N-diethoxyl toluidine, N,N-diethoxyl-1-aminopyridine, N,N'-diethoxyl piperazine, dimethyl-bis-ethoxyl hydrazine,N,N'-bis-(2-hydroxyethyl)-N,N'-diethylhexahydrop-phenylenediamine, N-12-hydroxyethyl piperazine, polyalkoxylated amines, such as propoxylated methyl diethanolamine, also such compounds as N-methyl-N,N-bis-3-aminopropylamine, N-(3-aminopropyl)-N,N'-dimethyl ethylenediamine, N-(3-aminopropyl)-N-methyl ethanolamine, N,N'-bis-(3-aminopropyl)-N,N'-dimethyl ethylenediamine, N,N'-bis-(3-aminopropyl)-piperazine, N-(2-aminoethyl)-piperazine, N,N'-bisoxyethyl propylenediamine, 2,6-diaminopyridine, diethanolaminoacetamide, diethanolamidopropionamide, N,N-bisoxyethylphenyl thiosemicarbazide, N,N-bis-oxyethylmethyl semicarbazide, p,p'-bis-aminomethyl dibenzyl methylamine, 2,6-diaminopyridine, 2-dimethylaminomethyl-2-methylpropanel, 3-diol. Most preferred are compounds that contain two amino groups. Examples of such compounds include ethylene diamine, 1,6-hexamethylene diamine, and 1,5-diamino-1-methyl-pentane.

Optionally, the reaction mixture may further comprise a catalyst to shorten the overall reaction time. In these embodiments, the amount of the catalyst present during the reaction may range from about 0.02% to about 0.08%, preferably from about 0.04% to about 0.07%, and more preferably from about 0.055% to about 0.065% by weight of the reaction mixture. Suitable catalysts include tin based materials such as di-butyl tin dilaurate, dibutylbis(laurylthio)stannate, dibutyltinbis(isooctylmercapto acetate) and dibutyltinbis(isooctylmaleate), and tin octaoate. Still other suitable catalysts include tertiary amines such as DABCO, pentametyldipropylenetriamine, bis(dimethylamino ethyl ether), pentamethyldiethylenetriamine, DBU phenol salt, dimethylcyclohexylamine, 2,4,6-tris(N,N-dimethylaminomethyl)phenol (DMT-30), 1,3,5-tris(3-dimethylaminopropyl) hexahydro-s-triazine, and ammonium salts. Most preferred is a di-butyl-tin dilaurate catalyst such as DABCO™ T-12 manufactured by Air Products and Chemicals, Inc. of Allentown, Pa.

Optionally, the reaction mixture used to form the isocyanate terminated prepolymer comprises one or more solvents. One or more solvents may be added to the reaction mixture, for example, to adjust the viscosity. In embodiments where a solvent is used, the solvent selected will not react with chemical reactants contained therein or the isocyanate terminated prepolymer. In these embodiments, the amount of solvent that is added may range from about 5% to about 20%, preferably from about 8% to about 15%, and more preferably from about 10% to about 12% by weight of the reaction mixture used in the first stage (i.e., the prepolymer synthesis) Suitable solvents include, but are not limited to, hydrocarbons (e.g., pentane or hexane); halocarbons (e.g., FREON™ 113); ethers (e.g., ethylether ($Et_2O$), tetrahydrofuran ("THF"), or 2-methoxyethyl ether (diglyme)); nitriles (e.g., $CH_3CN$); or aromatic compounds (e.g., benzotrifluoride). Still further exemplary solvents include, but are not limited to, lactates, pyruvates, acetone, 1,4-dioxane, 1,3-dioxolane, ethyl acetate, cyclohexanone, and methyl ethyl ketone. Other solvents, include dimethylformamide, dimethylacetamide, N-methyl-2-pyrrolidone (NMP), ethylene carbonate, propylene carbonate, naphthalene and substituted versions, dimethyl sulfone, benzophenone, diphenyl sulfone, dimethyl sulfoxide, diphenyl ether, terphenyl, and the like. Still further solvents include propylene glycol propyl ether (PGPE), propylene glycol methyl ether acetate (PGMEA), ethylene glycol, isopropyl alcohol (IPA), n-butyl ether, propylene glycol n-butyl ether (PGBE), 2-methoxyethyl acetate, 2-ethoxyethyl acetoacetate, and propylene glycol methyl ether (di ether works not mono ether). The solvents enumerated above may be used alone or in combination with one or more other solvents. In certain preferred embodiments, the solvent used comprises NMP. In these embodiments, the solvent may be removed via drying, distillation, or other means employed in the art. The solvent is preferably removed prior to dispersing the material in water.

In certain embodiments, the isocyanate terminated prepolymer prepared herein has a weight percentage of free isocyanate that ranges from about 0.75% to about 5%, excluding any non-reacting solvent.

As mentioned previously, the isocyanate terminated prepolymer prepared in the first stage is used in the second stage to prepare the aqueous polyurethane dispersion. The isocyanate terminated prepolymer is typically prepared in a suitable reactor wherein the reactants are suitably combined, mixed, and reacted in an optional solvent medium, and wherein heat may be transferred in to, and away from, the reactor. The synthesis of the isocyanate terminated prepolymer is preferably conducted in an atmosphere that minimizes or eliminates the introduction of water into the reaction mixture such as a nitrogen and/or inert atmosphere. The reactants may be added "neat" or within an aqueous and/or non-aqueous based solution. The reactants may be added slowly (gradually, as in a semi-batch process) over time, continuously, or quickly as a "shot" (batch wise) into the reactor. Typically, the reactants are gradually added ("grad-add") to the reactor. The reactants may be added in any particular order. However, it is preferable that the neutralizing agent be added prior to dispersing the prepolymer in water. After the isocyanate terminated prepolymer is prepared, the prepolymer is then dispersed in water. The isocyanate terminated prepolymer/reaction mixture may be dispersed in water using techniques well known in the art. In certain preferred embodiments, the reaction mixture is added to the water with agitation or, alternatively, water may stirred into the mixture. In the dispersing step, it is preferred that the prepolymer be added to water rather than adding water to the prepolymer. After and/or during the dispersing step, one or more chain extending agents is added and allowed to react to provide the aqueous polyurethane dispersion.

In certain preferred embodiments, the at least one diisocyanate, the at least one difunctional polyol, optional solvent, and optional catalyst are added to the reactor at room temperature under a nitrogen atmosphere. The reactor contents are then heated to one or more temperatures ranging from 70 to 80° C. After the desired temperature range has been reached, the at least one isocyanate reactive compound is then added to the reactor and the contents are further heated to one or more temperatures ranging from 90 to 120° C. The reaction mixture is maintained at this temperature range until the weight % free NCO is found to be between 1.9 and 2.2. The reactor is then cooled to one or more temperatures ranging from 65 to 75° C. One or more neutralizing agents are then added and allowed to react for a time ranging from 5 to 30 minutes or longer. The monofunctional chain terminator is then added to the reactor and allowed to react for a time ranging from 5 to 30 minutes or longer. In a second reactor, an appropriate amount of water to produce an aqueous dispersion containing from about 30 to about 40% by weight of solids is added. The contents of the first reactor are then added to the reactor containing the water with sufficient agitation to produce a translucent to white dispersion. Care is taken at this point not to allow the temperature in the second reactor to go above 40° C. Once the dispersion step is complete, one or more chain extending agents are added to the reactor and the contents of the reactor are heated to one or more temperatures ranging from 50 to 85° C. for a time ranging from 15 to 75 minutes or longer. The contents are then cooled to 35° C. and collected.

An exemplary scheme for preparing one particular embodiment of the aqueous polyurethane dispersion using a TMXDI™ diisocyanate is shown as follows.

Depending upon the end-use of the aqueous polyurethane dispersion, such as, for example as a lamination adhesive for electronic devices, it may be preferable that some, if not all, of the reactants have low impurity levels, i.e., contain less than 50 ppm of metal-containing impurities. In these embodiments, the reactants used within the reaction mixture preferably comply with the standard purity requirements set by the electronics industry. In this connection, the alkali metal impurity specifications for integrated circuit applications typically set the allowable impurity levels to approximately 20 parts per billion maximum for each type of alkali metal and less than 50 ppb total.

The aqueous polyurethane dispersion disclosed herein may comprise water and from about 20 to about 60 weight %, typically from about 30 to about 40 weight % solids wherein the solids content comprise a polyurethane polymer. The aqueous polyurethane dispersions may be further diluted to any proportion. The particle size of the polyurethane polymer molecules contained within the aqueous polyurethane dispersion is less than about 2.0 micron, preferably less than about 1.5 micron, and more preferably less than about 1 micron. The molecules contained therein are substantially linear rather than branched. The polyurethane polymer contained within the aqueous polyurethane dispersion has a theoretical free isocyanate functionality of approximately zero. The viscosity of the aqueous polyurethane dispersion may range from about 40 to about 12,000 cps, preferably about 100 to about 4,000 cps, and more preferably about 200 to about 1,200 cps. The dispersions are preferably optically opaque to transparent. The aqueous polyurethane dispersion will remain storage stable and fully dispersed within the aqueous media for extended periods of time. The $T_g$ of the polyurethane dispersion may range from about −60° C. to about 10° C., as determined by DSC calorimetry.

The aqueous-based polyurethane dispersion of the present invention is typically employed as laminating adhesives in which films of such materials as metal foils, e.g., aluminum, and polymeric materials, e.g., polyesters and low density polyethylene, are laminated to one another and to each other. Once dispersed within a dispersing media, the composition can be modified with other standard ingredients typically employed in formulating adhesives. For example, the dispersions can be combined with other typical ingredients used in adhesive compositions such as curing agents, plasticizers, crosslinking agents, pigments, thickeners, surface active compounds, defoamers, fillers, anti-settling agents, etc to provide an adhesive composition. The adhesives may then be applied to a substrate via dipping, knife coating, pouring, spraying, brushing, and other known methods. After the adhesive composition has been applied to the substrate, coated substrates are typically dried at room temperature or at one or more temperatures up to about 100° C. and subsequently conditioned under humidity conditions for a certain period of time.

The polyurethane polymer contained within the aqueous polyurethane dispersion of the present invention when dried has a base volume resistivity that ranges from $1\times10^{10}$ to $1\times10^{11}$ ohm-cm. In certain embodiments, the base volume resistivity can be adjusted within the range or outside the aforementioned range by adding an ionic additive such as an inorganic salt, organic salt, or combination thereof to the aqueous polyurethane dispersion. In these embodiments, the amount of ionic additive that is added to the aqueous polyurethane dispersion may range from about 0.001 to about 20%, preferably about 0.01 to about 10%, and more preferably about 0.01 to about 1% based upon weight of solids contained therein. The ionic additive may be added to the aqueous polyurethane dispersion neat or may be dissolved in an aqueous solution, non-aqueous solution, or combination thereof. The ionic additive is preferably dispersed within the aqueous polyurethane dispersion by agitation, i.e., sonication, mechanical mixing, etc. Exemplary ionic additives include lithium salts such as $LiCF_3SOF_3$, $LiClO_4$, $LiPF_6$, $LiBF_4$, $LiAsF_6$, and $LiN(CF_3SO_2)_3$.

The invention will be illustrated in more detail with reference to the following Examples, but it should be understood that the present invention is not deemed to be limited thereto.

EXAMPLES

In the following examples, unless stated otherwise, weight average molecular weight ($M_w$) was obtained by size exclusion chromatography (GPC) on a Waters Alliance 2690 Separator System connected to 2410 RI and 2996 PDA detectors. Samples of the polyurethane dispersions for GPC analysis were prepared in the following manner. A 25 to 45 mg amount of the aqueous polyurethane dispersion having a solid weight of approximately 30% was charged into 20 mL sample vials. A 10 mL amount of a 0.05M LiBr/DMF stock solution, which was prepared under agitation with magnetic stir bars and allowed to obtain complete dissolution, was also charged into the 20 mL vials using an electronic pipette to provide a 0.15% to 0.2% weight/volume concentration solution. The solution was then mixed for 10 hours or overnight using a slow stirring rate (i.e., vortex-free). After mixing, a 1.6+/−0.2 mL of solution from the 20 mL vial was transferred into the sample carousel that was then analyzed via GPC at a temperature of 40° C. and a flow rate of 1 mL/min to determine the molecular weight.

Unless stated otherwise, viscosity measurements were measured at 25° C. using a Brookfield viscometer at low shear.

Preparation of Aqueous Polyurethane Dispersions

Examples 1 and 6-8

A 1 liter jacketed glass reactor equipped with a pitch blade impeller was charged with 211 grams of the diisocyanate TMXDI™ (provided by Cytec Industries, Inc. of West Paterson, N.J.), 617 grams of the difunctional polyol VORANOL™ 220-056 (2000 $M_w$ poly(propylene oxide) diol) (provided by the Dow Chemical Company of Midland, Mich.), 110 grams of the solvent n-methylpyrrolidinone (NMP), and 0.52 grams of DABCO™ dibutyl tin dilaurate catalyst (provided by Air Products and Chemicals, Inc. of Allentown, Pa.) at room temperature. The contents of the reactor were stirred at 200 rpm and the material was heated to 85° C. A 41.48 gram amount of the isocyanate reactive compound dimethylol propionic acid (DMPA) was then added dry to the reactor. Care was taken during this step to avoid clumping of the DMPA. The contents of the reactor were then heated to 95° C. for approximately 4 hrs. The contents of the reactor were then cooled to 70° C. and the neutralizing agent triethyl amine (TEA) was added dropwise in the amount provided in Table I. The material was stirred for 15 minutes. At this point, 300 grams of the finished prepolymer were removed from the reactor and kept at a temperature range of 70 to 80° C. by heating in an oven in a sealed glass container.

A 455.7 gram amount of D.I. water were added to a 1 L jacketed glass reactor equipped with an external heating bath and a pitch blade impeller. The prepolymer was added to the D.I. water with agitation, 200 to 300 rpm, over 20 minutes to provide a translucent to white dispersion. Care was taken during the dispersion step to maintain a temperature below 40° C. A 70% aqueous solution containing the chain extending agent 1,6-hexamethylene diamine was then added dropwise to the dispersion in the amount provided in Table I. The dispersion was then heated to 80° C. for 1 hour, after which it was cooled to 35° C. and collected.

Figure 1:
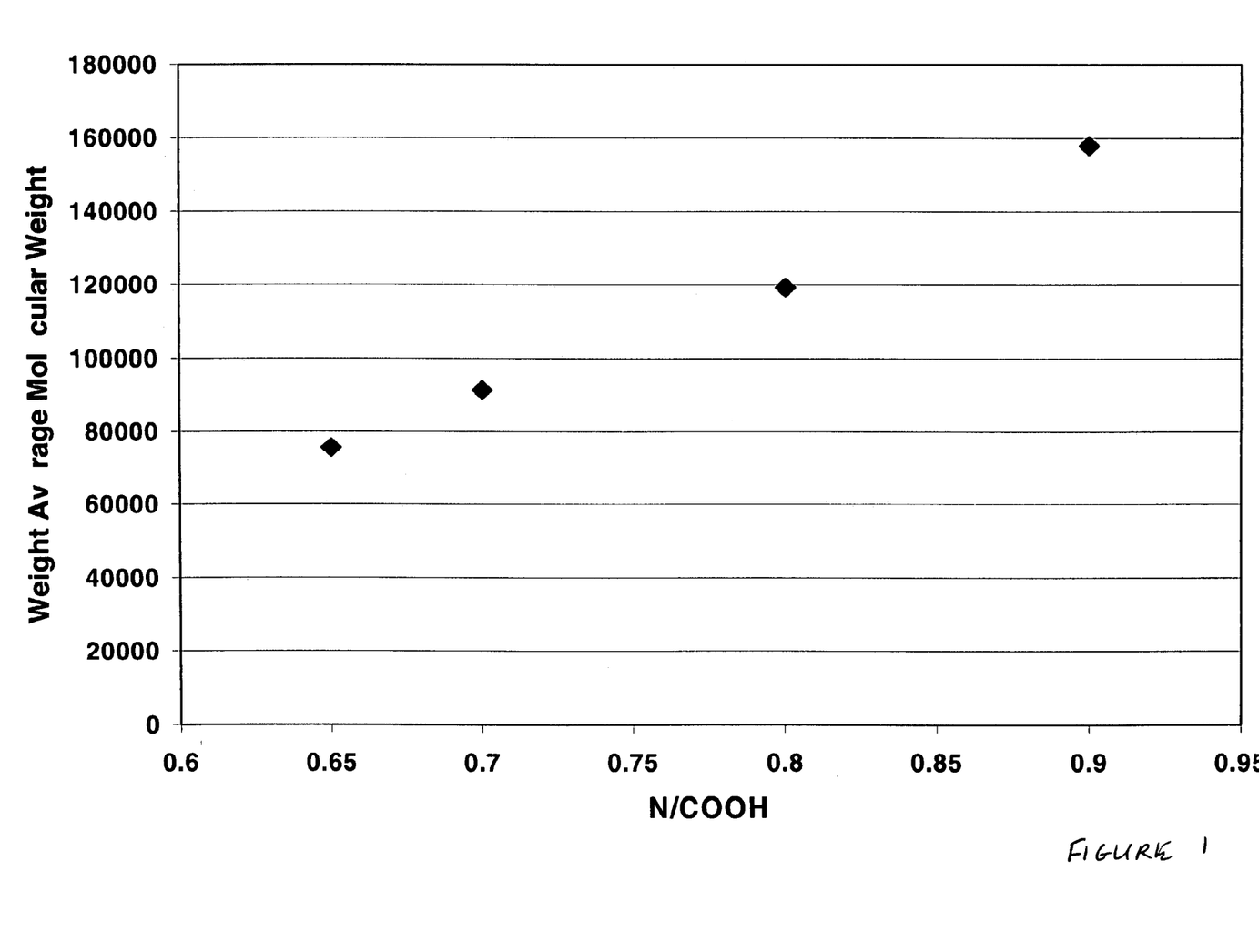
FIG. 1 shows the relationship between N/COOH ratio and weight average molecular weight ($M_w$) for exemplary TMXDI-based aqueous polyurethane dispersions.

Various properties of the aqueous polyurethane dispersions were measured, calculated or observed and the results are provided in Table II. FIG. 1 illustrates the relationship between N/COOH ratio and weight average molecular weight for Examples 1, 6, 7, and 8.

Examples 2-5 and 9-14

The same as examples 1 and 6-8 above except that the chain terminating agent di-n-butyl amine were added to the reactor dropwise in the amount provided in Table I and allowed to react for 30 minutes after adding the neutralizing agent triethyl amine in the amount provided in Table I and stirring for 15 minutes and prior to removing the 300 grams of the finished prepolymer from the reactor.

Comparative Example 1

A 1 liter jacketed glass reactor equipped with a pitch blade impeller was charged with 89 grams of the diisocyanate dicyclohexylmethane 4,4-diisocyanate (H12MDI™) (provided by Cytec Industries, Inc. of West Paterson, N.J.), 242.4 grams of the difunctional polyol VORANOL™ 220-056 (2000 MW poly(propylene oxide) diol) (provided by the Dow Chemical Company of Midland Mich.), 40.3 grams of the solvent n-methylpyrrolidinone, and 0.21 grams of DABCO™ dibutyl tin dilaurate catalyst (provided by Air Products and Chemicals, Inc. of Allentown, Pa.) at room temperature. The contents of the reactor were stirred at 200 rpm and the material was heated to 85° C. A 16.26 gram amount of the DMPA was then added dry to the reactor. Care was taken during this step to avoid clumping of the DMPA. The contents of the reactor were then heated to 95° C. for approximately 4 hrs. The contents of the reactor were then cooled to 70° C. and the neutralizing agent triethyl amine was added dropwise in the amount provided in Table I. The material was stirred for 15 minutes. At this point, 300 grams of the finished prepolymer were removed from the reactor and kept at a temperature range of from 70 to 80° C. by heating in an oven in a sealed glass container.

A 455.7 gram amount of D.I. water were added to a 1 L jacketed glass reactor equipped with an external heating bath and a pitch blade impeller. The prepolymer was added to the D.I. water with agitation, 200-300 rpm, over 20 minutes to give a translucent to white dispersion. Care was taken during the dispersion step to maintain a temperature below 40° C. A 70% aqueous solution containing of the chain extending agent 1,6-hexamethylene diamine was then added dropwise to the dispersion in the amount provided in Table I. The dispersion was then heated to 80° C. for 1 hour, after which it was cooled to 35° C. and collected.

Various properties of the aqueous polyurethane dispersions were measured, calculated or observed and the results are provided in Table II.

Comparative Examples 2-5

The same as comparative example 1 above except that the chain terminating agent di-n-butyl amine was added to the reactor dropwise in the amount provided in Table I and allowed to reactor for 30 minute after adding the neutralizing agent triethyl amine in the amount provided in Table I and stirring for 15 minutes and prior to removing the 300 grams of the finished prepolymer from the reactor.

TABLE I

Variations of Neutralizing Agent/Chain Terminating Agent/Chain Extending Agent

| Example | Neutralizing Agent | Chain Terminating Agent | Chain Extending Agent |
|---|---|---|---|
| 1 | 20.29 | 0 | 11.2 |
| 2 | 20.29 | 7.6 | 10.3 |
| 3 | 20.29 | 12.6 | 8.7 |
| 4 | 20.29 | 19 | 7.47 |
| 5 | 21.86 | 25.32 | 4.98 |
| 6 | 21.86 | 0 | 11.2 |
| 7 | 24.98 | 0 | 11.2 |
| 8 | 28.1 | 0 | 11.2 |
| 9 | 21.85 | 7.6 | 10.3 |
| 10 | 21.86 | 19 | 7.47 |
| 11 | 28.1 | 12.7 | 8.7 |
| Comp. Ex. 1 | 11.66 | 0 | 11.51 |
| Comp. Ex. 2 | 9.03 | 5 | 9.72 |
| Comp. Ex. 3 | 9.03 | 6.13 | 8.51 |
| Comp. Ex. 4 | 9.03 | 7.37 | 7.9 |
| Comp. Ex. 5 | 9.03 | 12.28 | 5.5 |

TABLE II

| Ex. | N/COOH (molar ratio) | Chain Term. Agent/NCO of prepolymer (molar ratio) | Weight Average Molecular Weight ($M_w$) | pH | % Solids | Viscosity (cPs) | Appearance |
|---|---|---|---|---|---|---|---|
| 1 | 0.65 | 0 | 75,596 | 7.47 | 34.5 | 390 | White |
| 2 | 0.65 | 0.1 | 53,105 | 7.7 | 35.2 | 400 | White |
| 3 | 0.7 | 0.2 | 31,887 | 7.4 | 35.2 | 182 | Bluish-White |
| 4 | 0.65 | 0.3 | 28,245 | 7.79 | 34.7 | 230 | White |
| 5 | 0.7 | 0.4 | 15,679 | 7.4 | 33.4 | 87 | Bluish-White |
| 6 | 0.7 | 0 | 91,938 | 7.54 | 35.2 | 503 | Bluish-White |
| 7 | 0.8 | 0 | 119,206 | 7.8 | 35.3 | 2900 | Translucent |
| 8 | 0.9 | 0 | 157,918 | 8.53 | 35.3 | gel like | Clear |
| 9 | 0.7 | 0.1 | 50,630 | 7.88 | 35.1 | 1510 | Bluish-White |
| 10 | 0.7 | 0.3 | 25,954 | 7.36 | 35.1 | 210 | Bluish-White |
| 11 | 0.9 | 0.2 | 41,438 | 7.55 | 35.6 | 340 | Translucent |
| Comp. Ex. 1 | 0.75 | 0 | 330,873 | 8.07 | 34.1 | 77 | White |
| Comp. Ex. 2 | 0.85 | 0.15 | 52,453 | 8.66 | 34.5 | 690 | Bluish-White |
| Comp. Ex. 3 | 0.95 | 0.25 | 37,803 | 7.69 | 35.3 | 774 | Bluish-White |
| Comp. Ex. 4 | 0.95 | 0.3 | 28,441 | 9.05 | 34.8 | 3000 | Bluish-White |
| Comp. Ex. 5 | 0.95 | 0.5 | 22,693 | 7.75 | 35.1 | 310 | Bluish-White |

Adhesive Properties of the Aqueous Polyurethane Dispersions

Exemplary polyurethane dispersions 2, 4, 6, and Comp. Ex. 2 and 5 were prepared as described above. Test strips were prepared for adhesive testing by coating the exemplary polyurethane dispersion onto the back of 18-point solid bleached sulfite Smurfit-Stone MaterBrite boxboard substrate using a #10 wire wound rod (approximately 1 wet mil). The coated strips were then dried in a forced air oven at 66° C. for 60 seconds and allowed to condition at ambient room temperature and humidity for 2 hours. Additional test strips were prepared in the same manner except that Kraft paper was used as the substrate. The test strips having the Kraft paper substrate were used for ease of lamination comparison only.

The coated surfaces were rated for their relative dry tack level against each other and ranked from highest to lowest wherein 1 is the highest level of tackiness and 6 is the lowest. The results of the tack evaluation are provided in Table III.

The ease of lamination was evaluated by pressing together two 1-inch wide strips of test strips, that had a Kraft paper substrate and the same exemplary adhesive composition, using a rubber roller and then pulling the strips apart and assessing the relative pressure required to achieve >50% fiber tear. The relative pressure was rated on a 1 to 5 scale, wherein 1 is the lightest pressure and 5 is the heaviest pressure during lamination. The results of the ease of lamination evaluation are provided in Table III.

Coated test strips having a boxboard substrate were evaluated for block resistance by placing the coated surface face to face at room temperature and at 50° C. forced air oven for 15 minutes with 500 gram weight per square inch to determine whether the adhesive picked fiber or pulled apart at the adhesive interface. The results of these tests, or the room temperature block or 50° C. block, are provided in Table III.

Coated strips were also evaluated for auto-adhesion by evaluating the adherence of two coated test strips that were pressured together face to face using 2-3 psi pressure exerted for 30 seconds) to form a bonded sample. The bonded samples were then evaluated for 30 minutes after compression pressure was applied by performing a 180° pull test on 1 inch wide coated board samples. The rate of separation was 2 inches per minute and recorded on a Series IX Instron Automated Materials Testing System. The results of these tests, or the maximum peel and the average peel over the 30 minute period, are provided in Table III.

TABLE III

| Example | Mw | Tack | Room Temp. Block | 50° C. Block | Maximum Peel | Average Peel | Ease Of Lamination |
|---------|------|------|--------|------------|-------|---------|---------|
| 4 | 28,245 | 1 | slight | slight | 0.11 | 0.06 | 1 |
| 2 | 53,105 | 2 | slight | pick fiber | 3.31 | 1.16 | 2 |
| 6 | 91,938 | 3 | slight | pick fiber | 2.17 | 0.84 | 4 |
| Comp. Ex. 5 | 22,693 | 4 | slight | pick fiber | 0.27 | 0.05 | 3 |
| Comp. Ex. 2 | 52,453 | 6 | none | none | 0 | 0 | 5 |

$T_g$ and Crystallinity Analysis

Figure 2A:
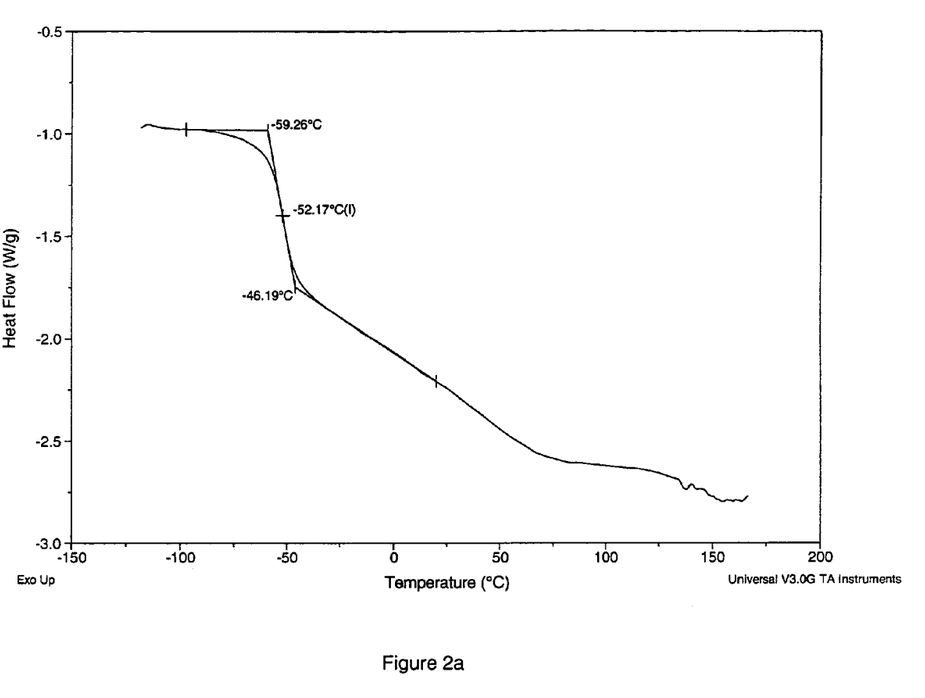
FIGS. 2a and 2b provide the Differential Scanning Calorimetry (DSC) and Thermogravimetric Analysis (TGA) curves, respectively, of an exemplary TMXDI-based polyurethane film of the present invention.
Figure 2B:
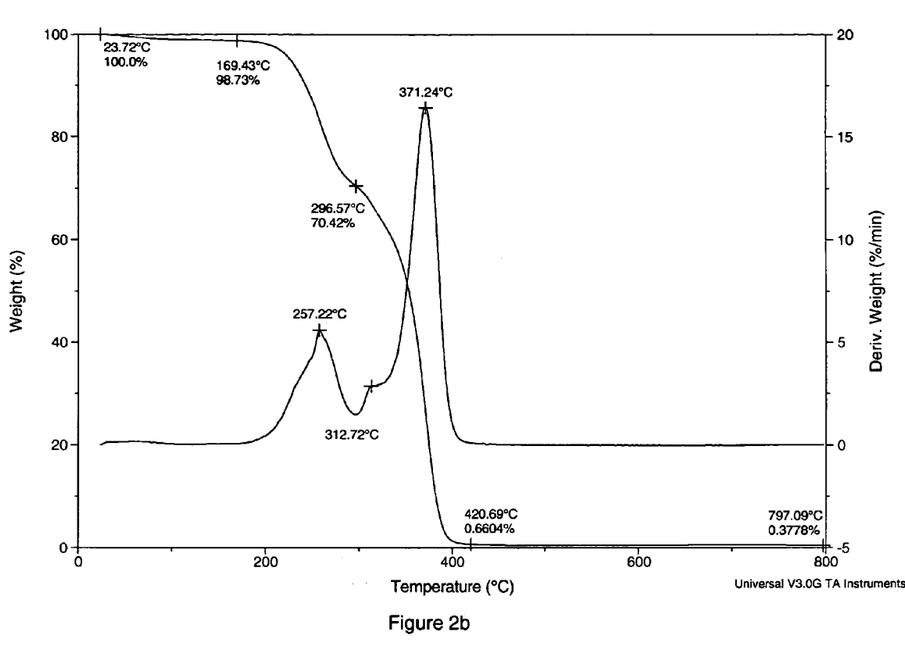

Exemplary polyurethane dispersion 2 was prepared as described above, coated onto a substrate, and allowed to dry into a film. The $T_g$ and crystallinity of the film was determined via differential scanning calorimetry (DSC) using a heating rate of 20° C./min and a helium purge gas having a flow rate of 25 cubic centimeter (ccm) using a crimped aluminum pan. FIG. 2a provides the DSC curve that shows a glass transition with an extrapolated onset of −59° C. and an inflection of −52° C. There was no evidence of exothermic crystallization of endothermic melt. Thermogravimetric analysis (TGA) was done to clarify the DSC baseline behavior above 50° C. using a heating rate of 10° C./min and a nitrogen purge gas having a flow rate of 100 ccm. The resultant weight loss curve provided in FIG. 2b indicates a two stage decomposition process above 200° C.

Volume Resistivity

Exemplary aqueous polyurethane dispersion 2 was prepared using the synthesis method described above. For example 2a, a 0.2 weight percent amount based upon solids of the ionic additive lithium triflate was added to the dispersion in the amount provided in Table IV at room temperature with agitation to effectively disperse the ionic additive therein. Both dispersions were coated onto a finger electrode and dried at 80° C. for 30 minutes and conditioned for 12 hours at 50% relative humidity and 25° C. The base volume resistivity of the aqueous polyurethane dispersion without and with the lithium triflate added was measured using a Eumetrics Dielectometer manufactured by Micromet Co. at a frequency measurement of 1 Hz and the averaged data results over a 30-minute time period (or 130 data points) are provided in Table IV.

TABLE IV

Volume Resistivity

| Example | Weight % of Lithium Triflate Ionic Additive | Volume Resistivity (ohm/cm) |
|---------|------|-------|
| 2 | 0 | $5.8 \times 10^{10}$ |
| 2a | 0.2 | $5.8 \times 10^{8}$ |

The invention claimed is:

1. A process for forming an aqueous polyurethane dispersion, the process comprising:
providing an isocyanate terminated prepolymer by reacting (i) at least one diisocyanate comprising about 50% by weight or greater of α,α,α,α-tetramethylxylene diisocyanate, (ii) at least one difunctional polyol comprising poly(propylene oxide) diol, and (iii) at least one isocyanate reactive compound comprising an acid functional group and at least two isocyanate reactive groups selected from the group consisting of a hydroxy, a primary amino, a secondary amino, and combinations thereof;
neutralizing the isocyanate reactive compound (iii) with a neutralizing agent comprising an amine group;
reacting the isocyanate terminated prepolymer with at least one chain terminating agent;
dispersing the isocyanate terminated prepolymer in water; and
reacting the isocyanate terminated prepolymer with at least one chain extending agent comprising an organic diamine selected from the group consisting of: ethylene diamine, 1,6-hexamethylene diamine, and 1,5-diamino-1-methyl-pentane, wherein the polyurethane polymer has a weight average molecular weight ranging from 40,000 to 60,000 g/mol, wherein the particle size of the polyurethane polymer molecules in the aqueous dispersion is less than about 2 microns, wherein the polyurethane polymer is non-crystalline, and wherein the aforementioned steps are conducted sequentially.

2. The process of claim 1 wherein a N/COOH molar ratio of amine in the neutralizing agent to acid functional group in the isocyanate reactive compound (iii) ranges from 0.5:1 to 1:1.

3. The process of claim 1 wherein the isocyanate terminated prepolymer comprises from 20 to 30% by weight of the at least one diisocyanate (i), from 65 to 75% by weight of the at least one difunctional polyol (ii), and from 3 to 6% by weight of the at least one isocyanate reactive compound (iii).

4. The process of claim 1 wherein the at least one diisocyanate (i) further comprises at least one diisocyanate selected from the group consisting of 3,5,5-trimethyl-1-isocyanato-3-isocyanatomethylcyclohexane isophorone diisocyanate (IPDI), tetramethylene diisocyanate, hexamethylene diisocyanate (HDI), 2,4-toluene diisocyanate, 2,6-toluene diisocyanate, isophorone diisocyanate, m-isopropenyl-α,α-dimethylbenzyl isocyanate (TMI), 4,4'dicyclohexylmethane diisocyante (H12MDI), benzene 1,3-bis (1-iscyanato-1-methylethyl), 1-5 naphthalene diisocyanate (NDI), p-phenylene diisocyanate (PPDI), trans-cyclohexane-1,4-diisocyanate (TMI), bitolylene diisocyanate (TODI), 4,4'-diphenylmethane diisocyanate, 4,4'-diphenyl dimethyl methane diisocyanate, di- and tetraalkyl diphenyl methane diisocyanate, 4,4'-dibenzyl diisocyanate, 1,3-phenylene diisocyanate, 1,4-phenylene diisocyanate, the isomers of tolylene diisocyanate, 1-methyl-2,4-diisocyanatocyclohexane, 1,6-diisocyanato-2,2,4-trimethyl hexane, 1,6-diisocyanato-2,4,4-trimethyl hexane, 1-isocyanatomethyl-3-isocyanatomethyl-3-isocyanato-1,5,5-trimethyl cyclohexane, chlorinated and brominated diisocyanates, phosphorus-containing diisocyanates, 4,4'-diisocyanatophenyl perfluoroethane, tetramethoxy butane-1,4-diisocyanate, butane-1,4-diisocyanate, hexane-1,6-diisocyanate, dicyclohexyl methane diisocyanate, cyclohexane-1,4-diisocyanate, ethylene diisocyanate, phthalic acid-bis-isocyanatoethyl ester, polyisocyanates containing reactive halogen atoms, sulfur-containing polyisocyanates, trimethyl hexamethylene di isocyanate, 1,4-diisocyanatobutane, 1,2-diiso­cyanatododecane, dimer fatty acid diisocyanate, partly masked polyisocyanates, and mixtures thereof.

5. The process of claim 1 wherein the particle size of the polyurethane polymer molecules in the aqueous dispersion is less than about 1 micron.

6. The process of claim 1 wherein the at least one diisocycanate (i) comprises about 80% by weight or greater of α,α,α,α-tetramethylxylene diisocyanate.

7. The process of claim 1 wherein the at least one difunctional polyol (ii) has a weight average molecular weight that ranges from about 400 to about 6,000 g/mol.

8. The process of claim 1 wherein the at least one difunctional polyol (ii) further comprises a polyol selected from the group consisting of polyethylene glycol (PEG), polytetramethylene glycol (PTMEG), and mixtures thereof.

9. The process of claim 1 wherein the at least one difunctional polyol (ii) comprises about 75% by weight or greater poly(propylene oxide) diol having a weight average molecular weight of 2,000 g/mol.

10. The process of claim 9 wherein the at least one difunctional polyol (ii) comprises about 95% by weight or greater poly(propylene oxide) diol having a weight average molecular weight of 2,000 g/mol.

11. The process of claim 1 wherein the at least one isocyanate reactive compound (iii) is selected from the group consisting of dimethylolpropionic acid (DMPA), dimethylol butanioc acid (DMBA), and mixtures thereof.

12. A process for forming an aqueous polyurethane dispersion comprising a polyurethane polymer wherein the polyurethane polymer non-crystalline and has a weight average molecular weight ranging from 40,000 to 60,000 g/mol, the process comprising:

preparing a reaction mixture comprising (i) at least one diisocyanate comprising about 50% by weight or greater of α,α,α,α-tetramethylxylene diisocyanate, (ii) at least one difunctional polyol comprising poly(pro­pylene oxide) diol, (iii) at least one isocyanate reactive compound comprising an acid functional group and at least two isocyanate reactive groups selected from the group consisting of a hydroxy, a primary amino, a secondary amino, and combinations thereof, optionally (iv) a catalyst, and optionally (v) a solvent, wherein the weight percentage of free isocyanate groups contained within the reaction mixture ranges from about 1.6 to about 2.6 weight percent based upon solids;

adding a neutralizing agent comprising a tertiary amino group to the reaction mixture wherein the neutralizing agent is present in an amount sufficient to neutralize from about 50 to about 105 mole percent based upon solids of the acid functional group contained within the at least one isocyanate reactive compound (iii);

adding a chain terminating agent to the reaction mixture wherein the chain terminating agent is present in an amount sufficient to react with from about 2 to 50 mole percent of the remaining isocyanate groups contained therein to provide an isocyanate terminated prepolymer;

dispersing the isocyanate terminated prepolymer in water to provide an aqueous dispersion; and adding a chain extending agent comorisina an organic diamine selected from the group consisting of: ethylene diamine, 1,6-hexamethylene diamine, and 1,5-di­amino-1-methyl-pentane to the aqueous dispersion in an amount sufficient to react with about 80 to 105 mole percent of the remaining isocyanate groups contained therein to provide the aqueous polyurethane dispersion, wherein the particle size of the polyurethane polymer molecules in the aqueous dispersion is less than about 2 microns, and wherein the aforementioned steps are conducted sequentially.

13. The process of claim 12 wherein the particle size of the polyurethane polymer molecules in the aqueous disper­sion is less than about 1 micron.

14. A process for forming an aqueous polyurethane dis­persion comprising a polyurethane polymer wherein the polyurethane polymer is non-crystalline and has a weight average molecular weight ranging from 40,000 to 60,000 g/mol, the process comprising:

preparing an isocyanate terminated prepolymer by react­ing (i) at least one diisocyanate comprising about 50% by weight or greater of α,α,α,α-tetramethylxylene diisocyanate, (ii) at least one difunctional polyol com­prising poly(propylene oxide) diol, and (iii) at least one isocyanate reactive compound comprising an acid functional group and at least two isocyanate reactive groups selected from the group consisting of a hydroxy, a primary amino, a secondary amino, and combinations thereof;

contacting the isocyanate terminated prepolymer with a neutralizing agent comprising an amine group;

controlling the weight average molecular weight of the polyurethane polymer by reacting the isocyanate ter­minated prepolymer with at least one chain terminating agent; and/or maintaining a N/COOH molar ratio of amine in the neutralizing agent to acid functional group in the isocyanate reactive compound (iii) to from about 0.5:1 to about 1:1;

dispersing the isocyanate terminated prepolymer in water to provide an aqueous dispersion; and adding a chain extending agent comorisina an organic diamine selected from the group consisting of: ethylene diamine, 1,6-hexamethylene diamine, and 1,5-di­amino-1-methyl-pentane to the aqueous dispersion in an amount sufficient to react with at least a portion of the isocyanate groups contained therein to provide the aqueous polyurethane dispersion, wherein the particle size of the polyurethane polymer molecules in the aqueous dispersion is less than about 2 microns, and wherein the aforementioned steps are conducted sequentially.

15. The process of claim 14 wherein the particle size of the polyurethane polymer molecules in the aqueous disper­sion is less than about 1 micron.

16. An aqueous polyurethane dispersion comprising a polyurethane polymer comprising the reaction product of:

(a) an isocyanate terminated prepolymer comprising the reaction product of (i) at least one polyisocyanate comprising about 50% by weight or greater of α,α,α,α-tetramethylxylene diisocyanate, (ii) at least one difunctional polyol comprising poly(propylene oxide) diol, and (iii) an isocyanate reactive compound com­prising an acid functional group and at least two isocyanate reactive groups selected from the group consisting of a hydroxy, a primary amino, a secondary amino, and combinations thereof;

(b) a neutralizing agent comprising a tertiary amino group;

(c) a monofunctional chain terminating agent;

(d) a chain extending agent comprising an organic diamine selected from the group consisting of: ethylene diamine, 1,6-hexamethylene diamine, and 1,5-diamino-1-methyl-pentane; and
(e) water,
wherein the polyurethane polymer has a weight average molecular weight ranging from 40,000 to 60,000 g/mol, wherein the particle size of the polyurethane polymer molecules in the aqueous dispersion is less than about 2 microns, and wherein the aqueous polyurethane dispersion when dried is free of crystallinity as determined by differential scanning calorimetry.

17. The aqueous polyurethane dispersion of claim 16 wherein the particle size of the polyurethane polymer molecules in the aqueous dispersion is less than about 1 micron.

18. The aqueous polyurethane dispersion of claim 16 wherein the base volume resistivity is adjusted by adding at least one additive selected from an inorganic salt, an organic salt, or mixtures thereof.

19. A process for forming an aqueous polyurethane dispersion comprising a polyurethane polymer wherein the polyurethane polymer is non-crystalline and has a weight average molecular weight ranging from 40,000 to 60,000 g/mol, the process comprising:
preparing an isocyanate terminated prepolymer by reacting (i) at least one diisocyanate comprising about 50% by weight or greater of $\alpha,\alpha,\alpha,\alpha$-tetramethylxylene diisocyanate, (ii) at least one difunctional polyol comprising poly(propylene oxide) diol, and (iii) at least one isocyanate reactive compound comprising an acid functional group and at least two isocyanate reactive groups selected from the group consisting of a hydroxy, a primary amino, a secondary amino, and combinations thereof;
contacting the isocyanate terminated prepolymer with a neutralizing agent comprising an amine group;
controlling the weight average molecular weight of the polyurethane polymer by reacting the isocyanate terminated prepolymer with at least one chain terminating agent; and/or maintaining a N/COOH molar ratio of amine in the neutralizing agent to acid functional group in the isocyanate reactive compound (iii) to from about 0.5:1 to about 1:1;
dispersing the isocyanate terminated prepolymer in water to provide an aqueous dispersion; and
adding a chain extending agent comprising an organic diamine selected from the group consisting of: ethylene diamine, 1,6-hexamethylene diamine, and 1,5-diamino-1-methyl-pentane to the aqueous dispersion in an amount sufficient to react with at least a portion of the isocyanate groups contained therein to provide the aqueous polyurethane dispersion, wherein the particle size of the polyurethane polymer molecules in the aqueous dispersion is less than about 2 microns, and wherein the aforementioned steps are conducted sequentially.

20. The process of claim 19 wherein the particle size of the polyurethane polymer molecules in the aqueous dispersion is less than about 1 micron.

21. An aqueous polyurethane dispersion comprising:
(A) a polyurethane polymer comprising the reaction product of:
(a) an isocyanate terminated prepolymer comprising the reaction product of (i) at least one polyisocyanate comprising about 50% by weight or greater of $\alpha,\alpha,\alpha,\alpha$-tetramethylxylene diisocyanate, (ii) at least one difunctional polyol comprising poly(propylene oxide) diol, and (iii) an isocyanate reactive compound comprising an acid functional group and at least two isocyanate reactive groups selected from the group consisting of a hydroxy, a primary amino, a secondary amino, and combinations thereof;
(b) a neutralizing agent comprising an amine;
(c) a chain terminating agent;
(d) a chain extending agent comprising an organic diamine selected from the group consisting of: ethylene diamine, 1,6-hexamethylene diamine, and 1,5-diamino-1-methyl-pentane; and
(e) water; and
(B) at least one ionic additive selected from an inorganic salt, an organic salt, and combinations thereof, wherein the polyurethane polymer is non-crystalline has a weight average molecular weight ranging from 40,000 to 60,000 g/mol, wherein the particle size of the polyurethane polymer molecules in the aqueous dispersion is less than about 2 microns.

22. The aqueous polyurethane dispersion of claim 21 wherein the particle size of the polyurethane polymer molecules in the aqueous dispersion is less than about 1 micron.

23. The aqueous polyurethane dispersion of claim 21 wherein the at least one ionic additive is an inorganic salt selected from the group consisting of $LiCF_3SOF_3$, $LiClO_4$, $LiPF_6$, $LiBF_4$, $LiAsF_6$, $LiN(CF_3SO_2)_3$, and mixtures thereof.

24. An aqueous polyurethane dispersion having a molecular weight ranging from 40,000 to 60,000 g/mol that, when dried, is non-cystalline, the aqueous polyurethane prepared by a process comprising the steps of:
providing an isocyanate terminated prepolymer by reacting (i) at least one polyisocyanate comprising about 50% by weight or greater of $\alpha,\alpha,\alpha,\alpha$-tetramethylxylene diisocyanate, (ii) at least one difunctional polyol comprising poly(propylene oxide) diol, and (iii) at least one isocyanate reactive compound comprising an acid functional group and at least two isocyanate reactive groups selected from the group consisting of a hydroxy, a primary amino, a secondary amino, and combinations thereof;
neutralizing the isocyanate reactive compound (iii) with a neutralizing agent comprising an amine group;
reacting the isocyanate terminated prepolymer with at least one chain terminating agent;
dispersing the isocyanate terminated prepolymer in water; and
reacting the isocyanate terminated prepolymer with at least one chain extending agent comprising an organic diamine selected from the group consisting of: ethylene diamine, 1,6-hexamethylene diamine, and 1,5-diamino-1-methyl-pentane, wherein the particle size of the polyurethane polymer molecules in the aqueous dispersion is less than about 2 microns, and wherein the aforementioned steps are conducted sequentially.

25. The aqueous polyurethane dispersion of claim 24 wherein the particle size of the polyurethane polymer molecules in the aqueous dispersion is less than about 1 micron.

* * * * *

UNITED STATES PATENT AND TRADEMARK OFFICE
CERTIFICATE OF CORRECTION

PATENT NO. : 7,342,068 B2
APPLICATION NO. : 10/715916
DATED : March 11, 2008
INVENTOR(S) : Eric Howard Klingenberg and Shafiq Nisarali Fazel It is certified that error appears in the above-identified patent and that said Letters Patent is hereby corrected as shown below:

Column 18, Line 50

In claim 4 delete the word "dilsocyante" and insert the word -- diisocyanate --

Column 19, Line 3

In claim 4 delete the word "di   isocyanate" and insert the word -- diisocyanate --

Column 19, Line 33

In claim 12 insert the word -- is -- between polymer and non-crystalline

Column 19, Line 63

In claim 12 delete the word "comorising" and insert the word -- comprising --

Column 20, Line 36

In claim 14 delete the word "comorisina" and insert the word -- comprising --

Signed and Sealed this

First Day of July, 2008

JON W. DUDAS
*Director of the United States Patent and Trademark Office*